INVENTORS
DANIEL C. HARRINGTON
ROBERT L. LILLESTRAND
MEREDITH S. ULSTAD
BY
Cushman, Darby & Cushman
ATTORNEYS CRITICAL REGION WITHIN
WHICH ACCEPTABLE CODES
FOR OPERATION OF SCANNING
OPTICAL SYSTEMS CAN BE FOUND

Fig. 5

MAXIMUM SIDE LOBE = 2
NUMBER OF SLITS  = 5

| STEP # | CODE | AUTOCORRELATION FUNCTION |
|---|---|---|
| 1 | 1 | 1 |
| 2 | 11 | 121 |
| 3 | 111 | 12321 |
| 4 | 1111 | 1234321 |
| 5 | 1101 | 112252211 |
| 6 | 111011 | 12223532221 |
| 7 | 1110101 | 1121325231211 |
| 8 | 11101001 | 111122252221111 |

FIGURE 6

MAXIMUM SIDE LOBE = 1
NUMBER OF SLITS  = 5

| STEP # | CODE | AUTOCORRELATION FUNCTION |
|---|---|---|
| 1 | 1 | 1 |
| 2 | 11 | 121 |
| 3 | 111 | 12321 |
| 4 | 1101 | 1113111 |
| 5 | 11011 | 121242121 |
| 6 | 110101 | 11121412111 |
| 7 | 1101001 | 1102114112011 |
| 8 | 11010001 | 110111141111011 |
| 9 | 110100011 | 12111112521111121 |
| 10 | 1101000101 | 1112011215121102111 |
| 11 | 11010001001 | 110210121151121012011 |
| 12 | 110100010001 | 111111021115111201111111 |
| 13 | 1101000100001 | 1101011111115111111101011 |

FIGURE 7

INVENTORS
DANIEL C. HARRINGTON
ROBERT L. LILLESTRAND
MEREDITH S. ULSTAD
BY Cushman, Darby & Cushman

| NO SLITS | CODE | | AUTOCORRELATION FUNCTION |
|---|---|---|---|
| 1 | 1 | | 1 |
| 2 | 11 | | 121 |
| 3 | 1101 | 1011 | 1113111 |
| 4 | 1100101 | 1010011 | 1111114111111 |

OPTIMAL CODES HAVING AMPLITUDE SIDE LOBES

| NO SLITS | CODE | AUTOCORRELATION FUNCTION |
|---|---|---|
| 5 | 110010000101 | 11111011111511111011111 |
| 5 | 101000010011 | 11111011111511111011111 |
| 5 | 110010101 | 11112121512121111 |
| 5 | 101010011 | 11112121512121111 |
| 5 | 100110101 | 1012221512221101 |
| 5 | 101011001 | 1012221512221101 |

| NO SLITS | CODE | PEAK | MAX NOISE |
|---|---|---|---|
| 6 | 1100100001000101 | 6 | 2 |
| 6 | 1010001000010011 | 6 | 2 |
| 6 | 11001000000010000101 | 6 | 1 |
| 6 | 10100001000000010011 | 6 | 1 |
| 7 | 11001(16 0's)1(8 0's)100000101 | 7 | 1 |
| 7 | 1010000(8 0's)1(16 0's)10011 | 7 | 1 |
| 7 | 11010010001000100001 | 7 | 2 |
| 7 | 10000100010001001011 | 7 | 2 |

FIG. 9 SELECTED CODE PATTERNS

Fig. 12

United States Patent Office 3,541,335
Patented Nov. 17, 1970

3,541,335
RADIATION STAR DETECTOR WITH CODED OPTICAL SCANNER
Daniel C. Harrington, Fridley, Robert L. Lillestrand, Edina, and Meredith S. Ulstad, Minneapolis, Minn., assignors to Control Data Corporation, Minneapolis, Minn., a corporation of Minnesota
Filed Nov. 22, 1967, Ser. No. 685,121
Int. Cl. G01d 5/36; G01j 1/20
U.S. Cl. 250—203                                    15 Claims

ABSTRACT OF THE DISCLOSURE

A scanning system for the detection of radiation, as from a star source, which includes a scanning disk provided with slits in a coded pattern. Radiation passing through the slits is converted to an electrical signal by a photodetector, and this signal is directed to a correlation device which develops an output having a central peak voltage and side lobes of lesser amplitude.

---

The present invention involves the observation of radiation sources, such as stars, in order to obtain information for determining the attitude and/or position of a space vehicle. There are two general types of detectors which may be utilized for this purpose. The first is a tracker which mechanically follows individual sources of radiation by using servomechanisms. The direction of the pointing axis of the tracker instrument is utilized in determining the desired result. The second system is of the scanning type which examines a relatively large field of view and utilizes the positions of targets within the field, and the times of star transit with respect to a reference for determining location and/or attitude.

In the optical tracker system, it is common to employ a chopping type reticle which produces a modulation of point-like targets. In systems of this type, the characteristics of the modulated signal provide a measure of the pointing error. This technique is described in Reticles in Electro-Optical Devices, by L. M. Biberman, wherein many types of chopping and signal processing schemes are described. In contrast, the scanning type system described here uses a discrete detection reticle in which modulation at a single frequency is not used, but rather the time (or angle) of appearance of each target as the slit crosses in front of it is measured. This leads to a basically different signal detection problem, particularly in view of the fact that this latter scheme involves no error signal and therefore no attempt to establish a null condition.

It is to radiation source observation by the scanning technique that the present invention pertains. In such an environment an optical system is employed, the system having a discrete element coded reticle to locate the target coordinates within the field of view. A number of reticle code configurations have been devised for rectangular, spiral, or other types of scanning patterns so as to obtain useful radiation information while lessening undesirable background radiation and other adverse elements which detract from the accuracy of the system. The present invention involves the use of a reticle having slit coding selected to be compatible with an auto-correlation arrangement so as to increase the signal derived from radiation from useful targets while at the same time reducing the probability of obtaining false information due to noise.

Of course, noise can be reduced by limiting the number of slits utilized in the reticle. However, this in turn causes a loss of useful radiation. To illustrate the problem, an example will be cited. For a scanning sensor which has a two second scan period and a rotational slit width of 30 seconds of arc, the transit time of a star with respect to the slit reference is 46.4 microseconds. With a 2.07 inch aperture in the optical system, a 3.5 magnitude star has a photon rate of $1.91 \times 10^6$ photons per second. Thus, while the star radiation can pass through the slit to a photodetector, such as a photomultiplier, the number of photons entering the optical system lens is $(4.64 \times 10^{-5})(1.91 \times 10^6) = 84$ photons. The radiation which reaches the photodetector is reduced by the optical system which typically has an efficiency in the order of 60 percent. Thus, the average number of photons reaching the photodetector is approximately 50. Conventional photomultipliers have an average quantum efficiency across the spectral region in question of approximately 10 percent. Thus, if a photomultiplier is used, the average number of photoelectrons generated by the 3.5 magnitude star during the single scan is 5. In order to reliably detect such a star and to accurately measure its transit time, and due to practical limitations on the system design, at least 30 photoelectrons are necessary.

From the foregoing it is apparent that an arrangement is necessary to increase the star signal without significantly altering the accuracy with which the transit time can be determined. This is accomplished by increasing the number of slits. In order to minimize the proportionately increased amount of noise, the output of the photodetector is directed to an electrical replica of the multiple slit pattern which performs an autocorrelation function. By the use of one of the codes to be hereinafter described in detail, a code having six slits and the output being connected to a multiple tap delay line arranged in accordance with the slit code, an average of 30 photoelectrons from a 3.5 magnitude star can be detected.

It is clear, therefore, that a principal object of the invention is to provide an arrangement for increasing the energy collected by celestial scanning systems to permit weaker radiation sources to be utilized, higher scanning speeds employed, or to allow a decrease in the size of the optical aperture for a given magnitude and scanning speed.

Ancillary to the foregoing, it is a further object of the invention to provide code patterns for a multiple slit scanner, associated with an autocorrelator, whereby the signal generated by the source is clearly distinguishable from the noise signal.

An additional object is to provide autocorrelators suitable for different lengths of codes, code types and scanning speeds.

An additional object is to provide a means for adjusting the speed of the scanner to match that of the correlator to maximize the correlator output from bona fide radiation sources.

Briefly, the invention includes the arrangement of multiple slits and spaces on a scanning disk in a code pattern such that the resultant detector output signal, when autocorrelated, has a central maximum peak and side lobes of lesser amplitude at other times. This may be accomplished, for example, by the use of an electrical delay line of length equal to the transit time of the slit pattern past a star image. Outputs may be tapped off the delay line to correspond with slits in the code pattern and then summed. To illustrate, using binary notation with a 1 indicating a slit and a 0 indicating a space, a simple code can be represented as —00101001100—. This code has seven elements of interest, including four slits, and the autocorrelation function is 1111114111111. The peak output signal is increased by a factor of four and four times the energy is received from the star. Duration of the signal is increased by a factor of 13. While the use of this invention serves to enhance the probability of target detection, it also enhances the angle accuracy achievable in the measurement of the target position. The total open area of the slit combination is a measure of the amount of radiation received by the detector, while the number of slit edges is a measure of the number of times that target position is detected.

The invention will become more fully apparent when considered in light of the following detailed description of illustrative embodiments thereof and from the appended claims.

The illustrative embodiments may be best understood by reference to the accompanying drawings, wherein.

Figure 1:
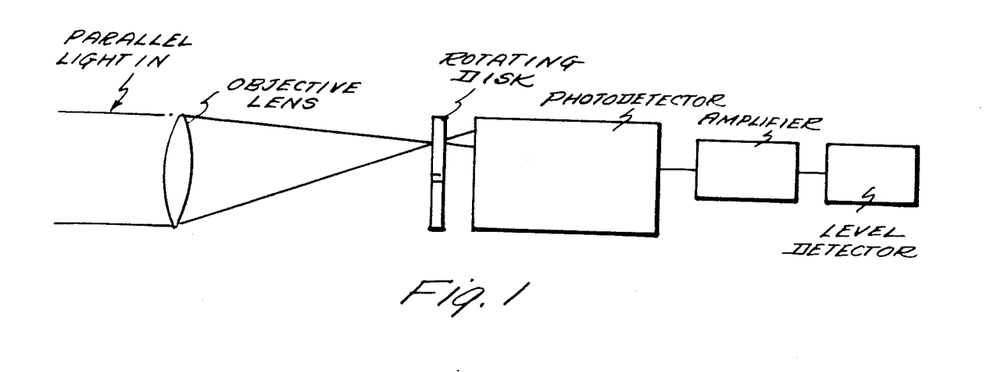
FIG. 1 is a block diagram illustrating a typical known scanning system.

Referring now to the drawings, the invention will be described in detail. FIG. 1 illustrates a typical conventional scanning system. Light from a radiation source, such as a star or other celestial object, is focused on a rotating disk by an objective lens. One or more slits in the disk allows light to periodically pass through the disk to a photodetector which converts the light energy to an electrical signal. This signal is amplified and then sensed by a level detector. By measuring the angular position of the disk and the time of transit of several radiation targets with respect to the slits, attitude and position of the vehicle carrying the scanner can be determined.

If a properly coded multiple slit pattern is utilized as the rotating disk of FIG. 1, and a tapped delay line and summing circuit are inserted ahead of the level detector, signal enhancement results. Such an arrangement is illustrated in FIG. 2.

Figures 2, 3:
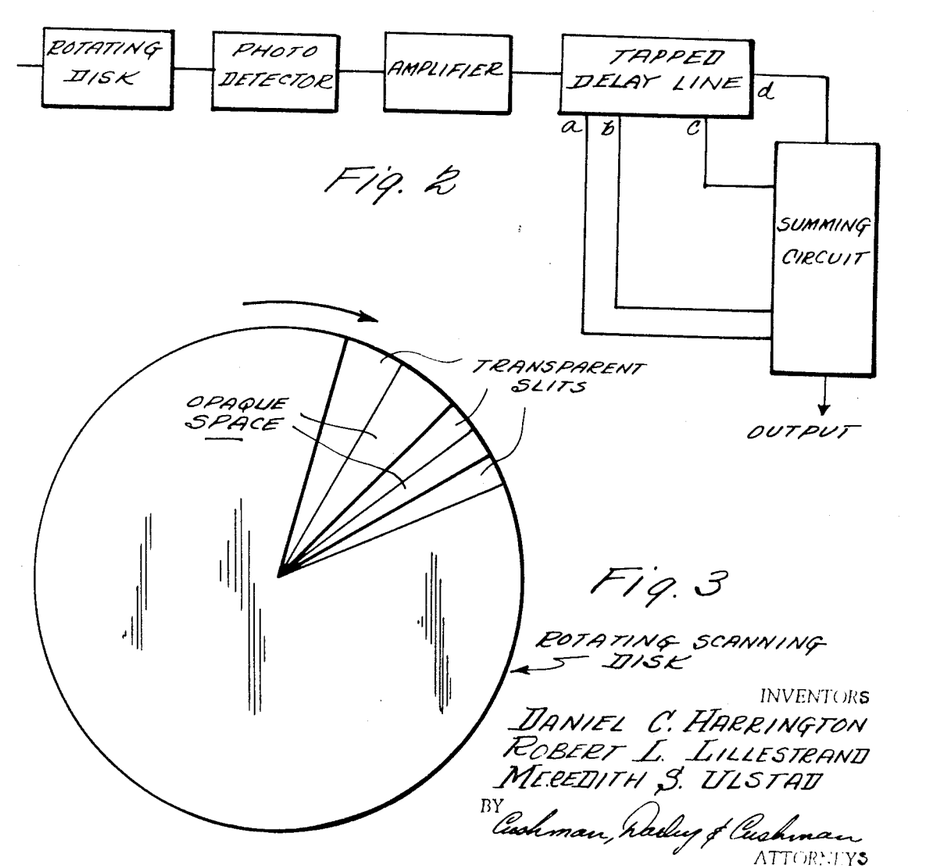
FIG. 2 is a block diagram illustrating a scanning system which includes an autocorrelator.
FIG. 3 illustrates a coded four-slit scanning disk composed of a total of seven elements which may be utilized as the rotating disk of FIG. 2.

An example of a coded disk is shown in FIG. 3. Here the disk, which rotates in the direction of the arrowhead, is provided with two single and one double slit. Each single slit is represented by the binary 1, and therefore, the double slit is representative of the binary 11. The two single slits are separated by an opaque space having a width corresponding to that of a single slit. Such an arrangement represents a binary 0. The double slit is separated from the single slit by an opaque double space representative of the binary 00. Thus, the code formed on the scanning disk is 1010011.

Figure 4:
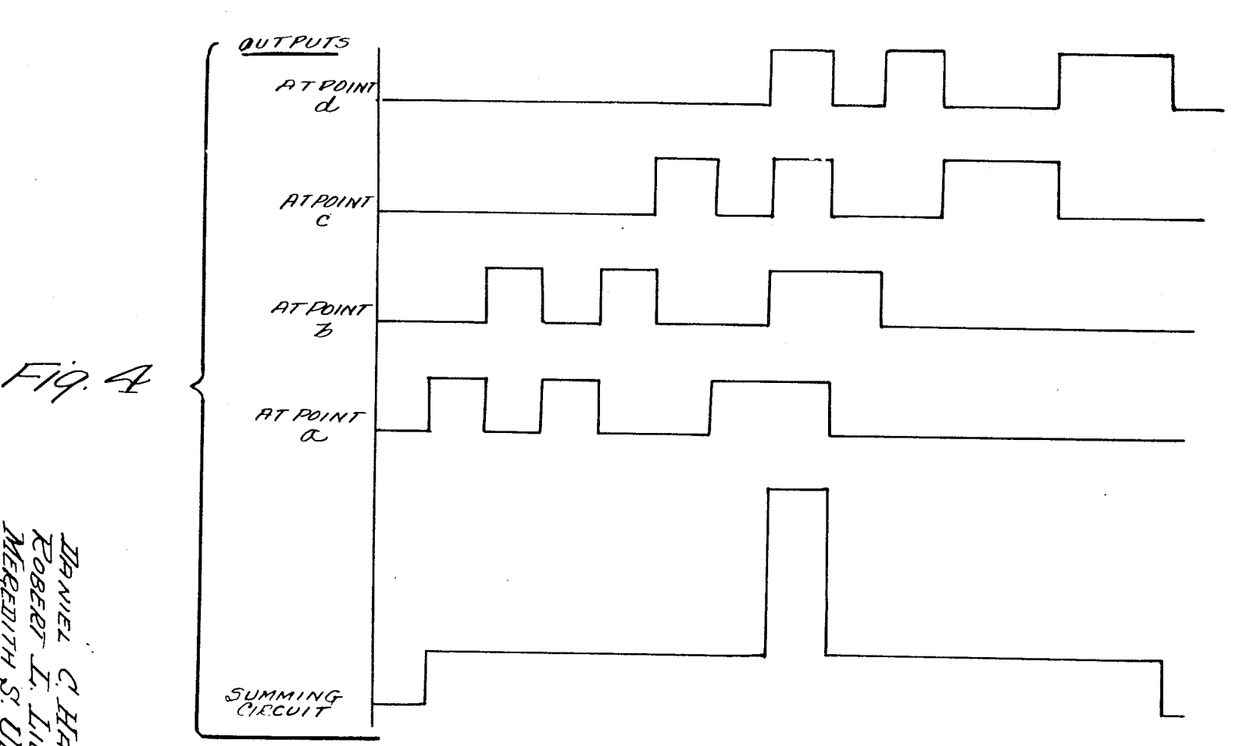
FIG. 4 is a timing diagram illustrating the outputs at the taps of the delay line of FIG. 2, and the sum of these outputs.

The delay line of FIG. 2 has an electrical length proportional to the distance of each of the individual slits from the first or last slit in the code. The delay line is appropriately tapped so that at a particular scanner speed, the summation of pulses propagated along the delay line will add up to a maximum at one point in time, but will have side lobes of constant lesser values at all other times. This can be appreciated by considering FIG. 4. The tap points $a$–$d$ along the delay line are separated with respect to one another to develop output waveforms in time displacement as illustrated. The combined output developed by the summing circuit of FIG. 2 is also illustrated in FIG. 4. This waveform illustrates a maximum center and constant value side lobes.

The foregoing relationship between the scanning disk and the delay line requires that the scanning disk be rotated at constant speed. The code described is an ideal one in that it is the shortest possible length for the gain achieved while maintaining the off-peak correlation noise constant at a value of one unit. Longer codes can be generated if off-peak excursions to zero signal are allowed.

Basically, a number of requirements must be met in an optimal code pattern such as that just described. These are:

(A) The code pattern should be as narrow as possible in its angular subtent around the disk. This is desirable because:

(1) The greater the size of the pattern, the larger the possibility that more than one star will be feeding energy into the delay lines at one time.

(2) Extended targets such as the sun may be in the field of view of the optical system, and it is undesirable to restrict operation of the system to those cases in which no extended targets are in the field of view.

(3) The design of the delay lines in terms of size and accuracy is made more difficult if the pattern extends over a large portion of the scanning disk.

(B) The code should be such that the summed signal is a constant value corresponding to that of a single pulse, except at the central point of the autocorrelation function at which point it should have an amplitude equal to the total number of slits in the code. This is desirable because:

(1) Multiple pulse amplitudes in the autocorrelation function at points other than the central one reduce the signal to noise ratio.

(2) Zeros in the autocorrelation function may imply that the slit pattern is too spread out.

In the sense defined above, an optimal non-cyclic code can be obtained for patterns containing not more than four slits. The code and the resultant autocorrelation pattern for these optimal cases are shown in the following table.

OPTIMAL CODES

| Code: | Autocorrelation function |
|---|---|
| 1 | 1 |
| 11 | 121 |
| 1101 | 1113111 |
| 1100101 | 1111114111111 |

The above codes comply with several equations, wherein:

$N_1$ = number of ones (slits) in code
$N_0$ = number of zeros (opaque areas) in code
$N_T$ = Total number of digits in code
$(N_T = N_1 + N_0)$
$N_{ac}$ = total number of digits in the autocorrelation function These are:

(1) $$N_{ac} = N_1^2 - N_1 + 1$$

(2) $$N_T = \frac{N_{ac}+1}{2} = \frac{N_1(N_1-1)}{2} + 1$$

and (3) $$N_0 = N_T - N_1 = \frac{(N_1-1)(N_1-2)}{2}$$

From Equation 3 it can be appreciated that as the number of slits increases, the number of zeros required increases very rapidly, and thus the dispersion of the code on the scanning disk increases. This has the undesirable effect of causing the probability of finding two or more stars in the code pattern at one time to increase.

By an investigation of code patterns in accordance with Equations 1–3, it becomes clear than when the number of slits exceeds four, no optimal codes exist. The resultant autocorrelation functions either contains larger side lobe pulses or an excess of zeros. To illustrate this fact, the following table is presented:

AUTOCORRELATION FUNCTIONS FOR $N_1=5$

| $N_0$ | Code | Autocorrelation function |
|---|---|---|
| 4 | 110010101 | 11112121512121111 |
| 4 | 100110101 | 10112221512221101 |
| 6 | 11001000101 | 111110211151112011111 |
| 6 | 11000100101 | 111102111151111201111 |
| 6 | 11000010101 | 111111102151201111111 |
| 7 | 110010000101 | 1111101111151111011111 |

Using Equation 3, the value of $N_0$ is 6. However, the autocorrelation functions when $N_4=6$ all include 2's. This effectively is a doubling of the autocorrelation noise pulses. Since noise pulses having the value of 2 are present, the number of zeros in the code can be reduced to increase the density of the autocorrelation function. In the foregoing example, when $N_0=4$, a code is available which produces no zeros in the autocorrelation function. This is called a maximum density code.

It is also clear that by increasing the number of zeros to 7, a code is available to produce an autocorrelation function without a noise pulse value of 2. Such a code is called a minimum noise code and it follows the equation:

(4) $\quad N_0 = 2^{N_1-2} - 1$

Since $N_0$ is an exponential function of $N_1$, it is clear that the number of zeros increases very rapidly as compared with the number of zeros required by the previous code, wherein:

$$N_0 = \frac{(N_1-1)(N_1-2)}{2}$$

The length of the autocorrelation pattern is defined by:

(5) $\quad N_{ac} = 2N_T - 1$

Figure 5:
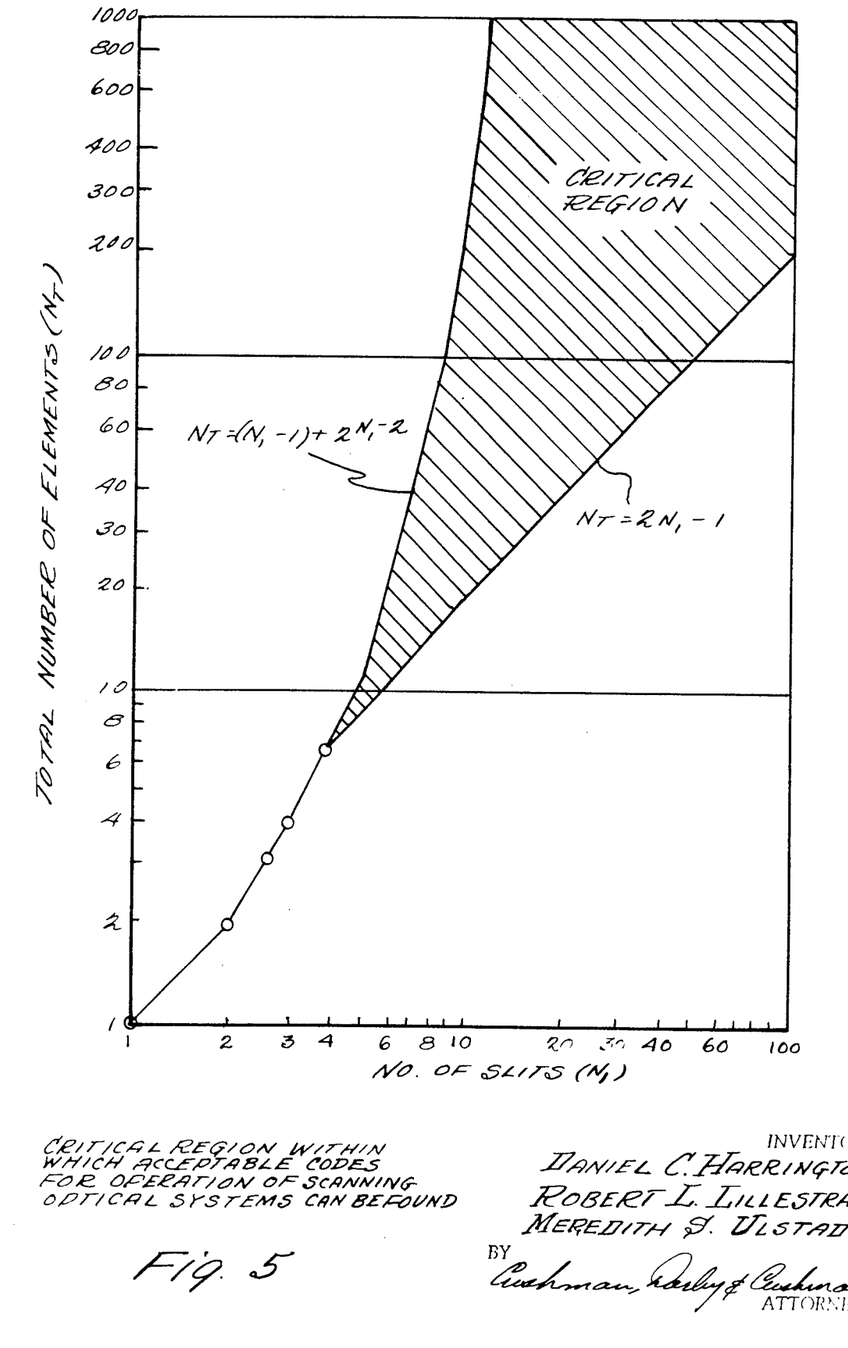
FIG. 5 graphically illustrates the useful range of code lengths within which acceptable codes for the present scanning system may be found.

The maximum density code and the minimum noise code which have just been described represent extreme values in terms of the number of zeros used in the code pattern for a given value of $N_1$. Generally acceptable code limits are graphically illustrated in FIG. 5. The most satisfactory code for a given application generally will lie between the lines defined by the equations:

$$N_T = (N_1-1) + 2^{N_1-2}$$

and $$N_T = 2N_1 - 1$$

From Equations 3 and 4, the number of zeros in the code must therefore lie within the following limits:

(7) $\quad \dfrac{(N_1-1)(N_1-2)}{2} \leq N_0 \leq 2^{N_1-2} - 1$

For $N_1=2$, 3 and 4, the same value of $N_0$ is obtained at both limits, and therefore, for these cases, both codes involve the same number of zeros (as well as the same pattern). It is only for $N_1>4$ that the number of elements in the code differs.

As an example of the use of a relatively large number of slits in maximum density and minimum noise codes, a ten slit pattern is now cited:

$N_T$ (min. noise) = 265 and $N_T$ (max. density) = 46

Thus, the minimum noise code requires about six times the area on the rotating disk as is required by the maximum density code. This means that the expectation of finding several bright stars in the code pattern at one time is significantly larger for the minimum noise code. However, the increased magnitude of background noise in maximum density codes introduces the possibility that such noise is erroneously interpreted as a star. Thus, in selecting an appropriate code pattern when $N_1$ is greater than 4, the possible disadvantages of introducing increased noise pulses with a maximum density code and increased space requirements for a minimum noise code must be weighed.

Now that the various types of codes have been described, a method will be described which provides a means for producing a sequence of zeros and ones whose autocorrelation function always yields side lobes less than or equal to a preselected magnitude $q$ when any arbitrarily selected number of ones are used in the sequence. The sequence which is developed according to this method will not necessarily be the shortest possible sequence, but have the advantage that it allows the number of ones in the sequence and the maximum noise value $q$ to be predetermined. The method has the further advantage in that it can be accomplished by a digital computer, thereby allowing a great number of sequence combinations to be tried in order to enable selection of the shortest sequence involving a given selection of values of $q$ and number of slits (ones). The sequence's elements can be defined by:

$S = \{s_0, s_1 \ldots s_i \ldots s_k\}$ where $s_i = 0, 1$

The method is begun by making $s_0 = 1$. The steps that follow consist of augmenting this truncated version of the final sequence by either a 0 or 1. In each step, a 1 is added to the next element bit position $s_1$ and a bit by bit comparison is made of the new truncated sequence with itself. This is accomplished by shifting the truncated sequence past a replica of itself and summing the number of 1 digits which come into correlation in each shift position. In this manner, an autocorrelation function can be developed which shows the number of 1 bits which are correlated for each shift position. If the summation for any shift position exceeds the value chosen for $q$, the last 1 placed in position $s_i$ must be replaced by a zero. The next 1 should then be placed in position $s_i+1$ and the foregoing procedure repeated to determine whether the new summation exceeds the $q$ value in any shift position.

Figure 6:
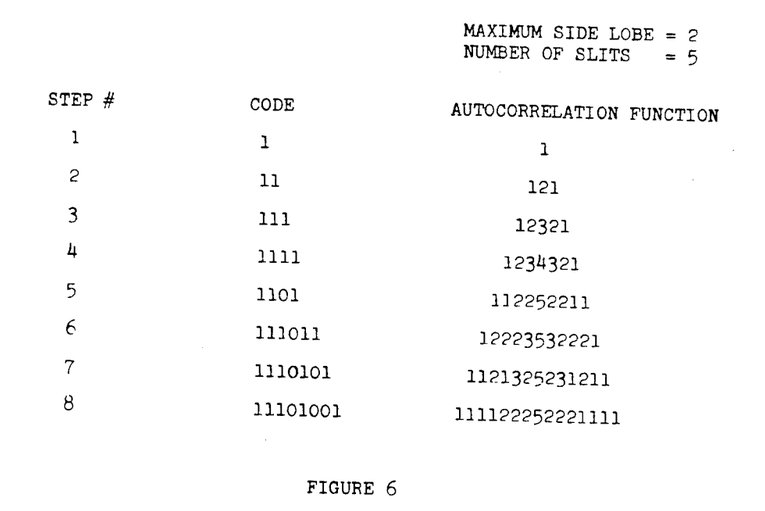
FIG. 6 illustrates a method of generating codes which when correlated have off-peak maximum values equal to two.

FIG. 6 illustrates the steps involved in formulating a code having five slits and a maximum side lobe correlation of 2 ($q=2$). In step 1, the first digit is chosen to be 1 which produces a correlation function of 1. In step 2, another 1 is added to the next sequence position, and the shifting and summation procedure yields a correlation function of 121. The correlation function produced as a result of adding another 1 in step 3 is still within the maximum side lobe requirement. However, in step 4 the addition of another 1 gives a correlation function having a three-unit side lobe. Therefore, in step 5, the last 1 is replaced by a 0 and a 1 is added to the end of the sequence. This yields a correlation function within the predetermined requirement, but having only four 1's in the code. Another 1 is added in step 6, producing a correlation function which is out of tolerance. Step 7 replaces the last 1 with a 0 and adds another 1, but still yields a correlation function which is out of tolerance. Again in step 8, the last 1 is replaced with a 0 and another 1 is added. The resultant correlation function has the proper tolerances for maximum side lobe amplitude. Therefore, step 8 gives the slit pattern required using five slits and having a maximum side lobe amplitude of 2.

Figure 7:
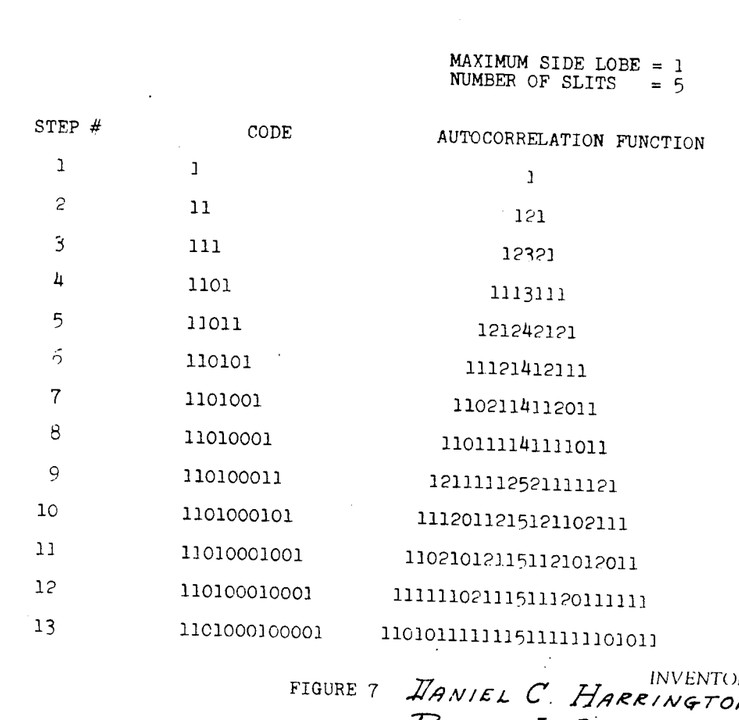
FIG. 7 also illustrates a method of generating codes, as in FIG. 6, except that the codes have off-peak maximum values of one.

FIG. 7 illustrates the method just described for the case of maximum side lobe amplitude = 1 and a code pattern comprising five slits. The procedure used in developing codes such as those shown in FIGS. 6 and 7 can be programmed for a computer so as to synthesize a large number of codes of different lengths for various side lobe noise levels.

The foregoing method does not disclose all possible codes, or even the most compact types, and trial and error methods must be used to provide an improvement. One feature of any code of this type is that its inverse results in the same autocorrelation function. It is thus possible that all codes could be generated by using the starting methods given and forming all combinations possible by reversing the code between steps.

Figure 8:
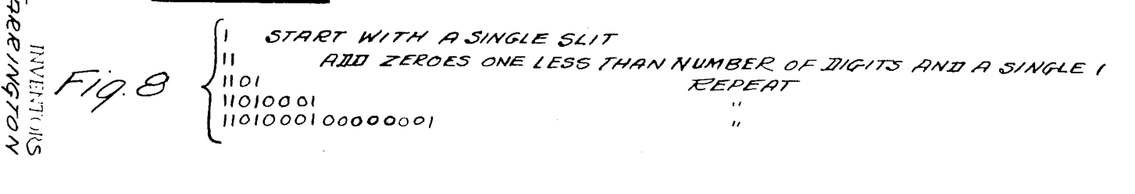
FIG. 8 illustrates a method of generating codes of a minimum noise type by a simple geometrical construction.

FIG. 8 illustrates a simple method for synthesizing codes of the minimum noise type, but at the expense of code length. This is accomplished by starting with a single slit and, for each increase in code length, adding spaces equal to one less than the total previous number of spaces and slits, followed by another slit. This method displaces adjacent slits by an amount equal to the previous slit pattern width and thereby eliminates the necessity for considering the values of the correlation function at different time separations. However, as can be seen from FIG. 8, code lengths rapidly become quite large as the number of slits are increased.

Figure 9:
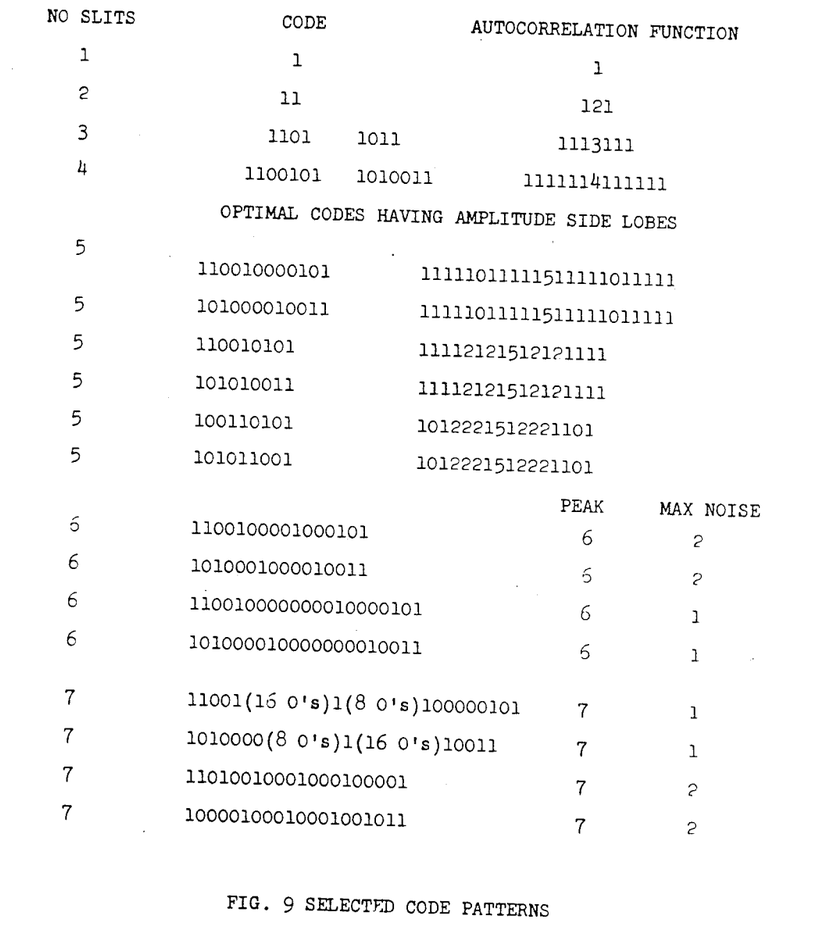
FIG. 9 illustrates four optimal codes having constant amplitude side lobes, as well as additional useful codes.

Compact codes are useful for star detection since they reduce the ambiguity resulting when more than one star transits the slit pattern at one time. The four optimal codes previously tabulated are, of course, the most compact. These codes, having constant backgrounds, are illustrated in FIG. 9 together with several other useful codes developed by various methods, including trial and error.

The code types and methods for synthesizing same having been discussed, a principal problem area of mechanization of the invention will now be considered. The most persistent difficulty associated with the use of multiple slit scanners is the inherent increase in background noise. One means for improving the signal-to-noise ratio is by the use of a non-linear photodetector, such as a cadmium selenide device, or by non-linear amplification of the photodetector output. Another approach for relieving the problem is by the use of multiple photodetectors.

Figures 10, 11:
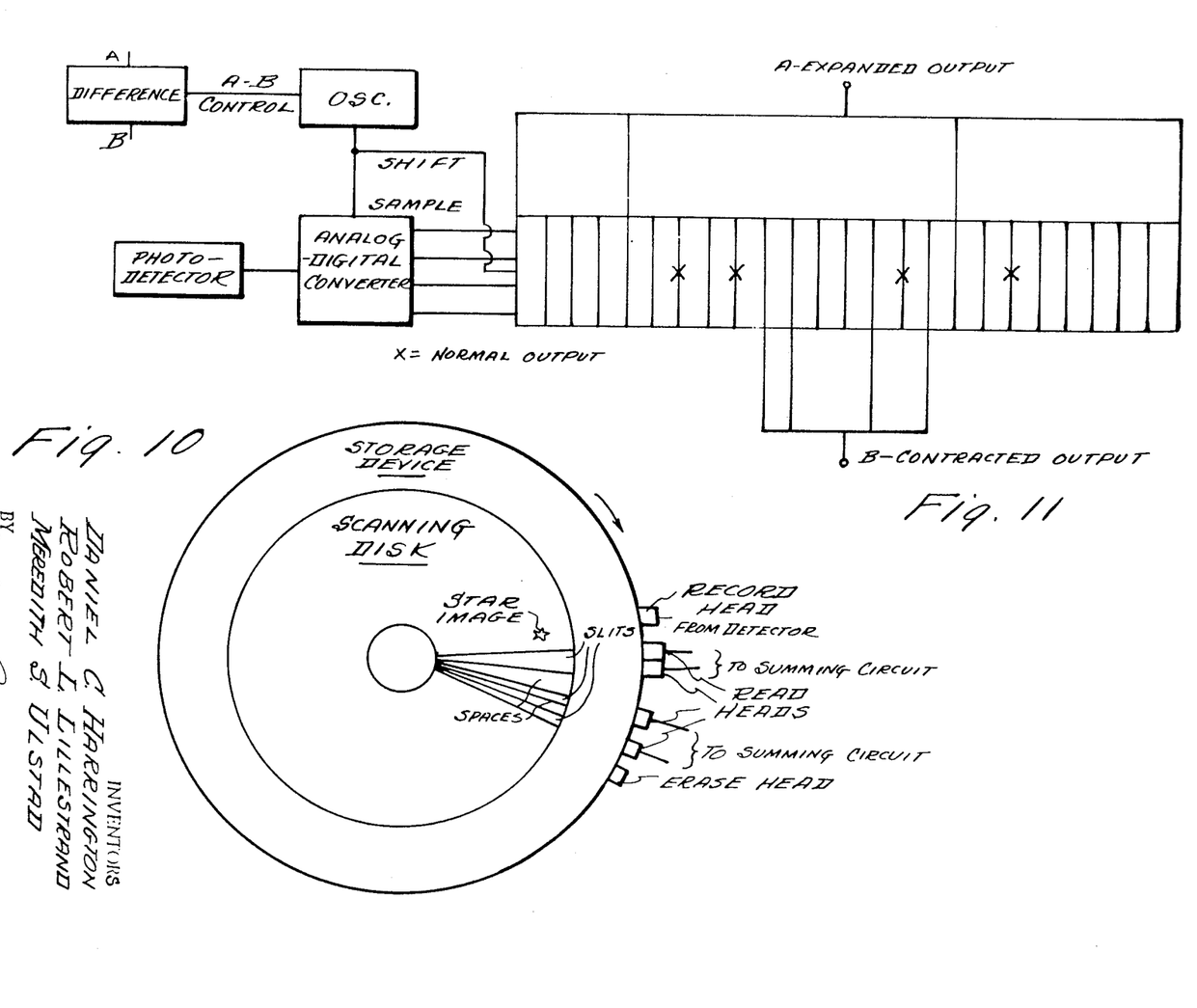
FIG. 10 schematically illustrates a correlation arrangement which may be substituted for that shown in FIG. 2.
FIG. 11 is a block diagram of an arrangement to provide a servo control of scanning disk rotation, propagation time of data through a shift register, or of a variable delay line.

While the structure heretofore described as capable of performing the autocorrelation has been the delay line and summing circuit, other arrangements are also possible. If the scanning system is intended just to improve detectability, and not time of occurrence of the signal, a simple multiple coincidence scheme could be used whereby each slit pulse is detected separately. A simpler approach where detection only is of importance is to integrate the signal for a time equivalent to the slit pattern length. A convenient method of delay generation for a scanning system may employ a magnetic or other erasable storage device attached to the scanning slit disk, as shown in FIG. 10. Signals from the photodetector are recorded on the rotating medium and appropriately spaced reading heads provide simultaneous output. The medium is erased as it passes beyond the last reading head. By utilizing a direct signal, one of the reading heads shown could be eliminated.

Figure 12:
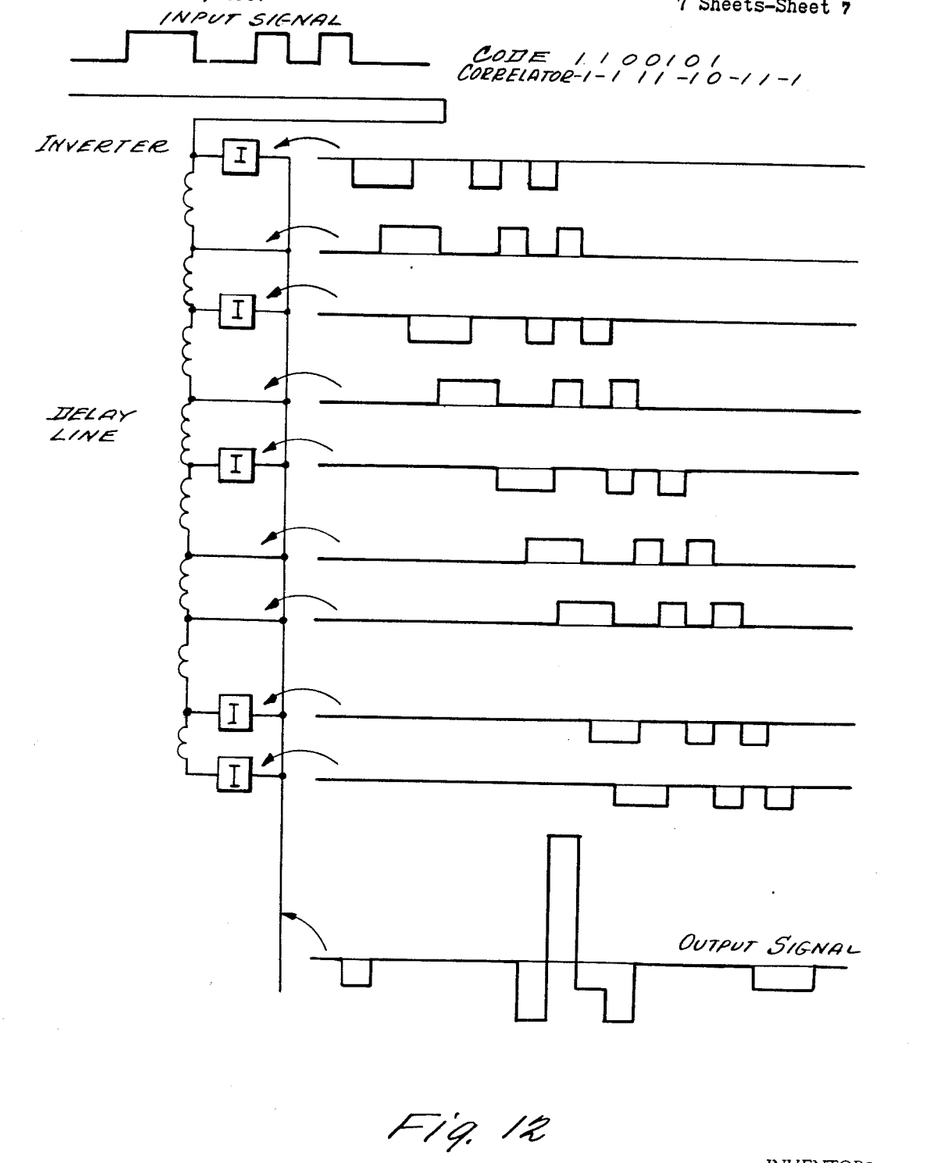
FIG. 12 illustrates a correlation arrangement which includes inverting amplifiers attached to delay line taps.

Certain advantages can be obtained if the signal emerging from certain of the delay line taps is multiplied by a minus one, that is, a signal inverter is used. For example, consider the case in which the slit code is 1100101. According to the technique described earlier, the taps on the delay line would be the same. However, if the now add inverter taps to locations previously occupied by zeros, and if the number of these inverter taps is equal to the number of code taps (or one greater) we can obtain a series of delay line taps of the form: −1, −1, 1, 1, −1. 0, 1, −1, 1, −1. The output signal in this case has the appearance: −1, 0, 0, 0, 0, 0, −2, 4, −1, −2, 0, 0, 0, 0, −1, −1. FIG. 12 shows the mechanization for this case. Note that the output signal is now always driven positive in the center in accordance with the original scheme, but that there are always zero or negative outputs at locations on either side of the peak. This design approach leads to the following improvements as compared with the system which does not use inverters:

(a) Side lobes.—By proper selection of the negative delay line taps, the side lobes of the signal can be made zero or negative. This permits a threshold system to operate with a wide range of star intensities (say 100:1) without false detections on the side lobes of the autocorrelation pattern of bright stars.

(b) Background radiation.—By using slightly more negative delay line taps than positive taps, the average output from diffuse background radiation can be made negative. This eliminates the need for a floating bias level and generally performs the function of a high pass filter. This technique is basic if the system is to occassionally scan through bright regions of the sky.

(c) Angle accuracy.—Greater angle accuracy can be achieved when using negative taps, if they are arranged so as to create negative side lobes immediately adjacent to the central peak. This is particularly true for a threshold system in which a greater slope is achieved at the time of crossing the triggering level.

A further property of systems using inverters to create negative delay line outputs is worthy of mention. When the background radiation passing through the slit increases, the reference point for the stellar signal becomes increasingly negative since the number of inverters (−1's) will be slightly greater than the number of uninverted signals (+1's). This means that only the brightest stars will be detected in regions of large background radiation. This is, of course, as it should be since it is in these regions where the degenerative effects of background noise on angle accuracy are the greatest.

Digital processing of the detected signals is also possible by converting the photodetector output into an appropriate binary number at a suitable sampling rate and shifting such binary information through a multiple bit register, as shown in FIG. 11. For a four slit code, as illustrated in FIGS. 3 and 10, the outputs at the stages marked "X" are summed for the analog autocorrelation function. A digital adder could also be used to retain the digital form of the data. Only that part of the shift register between the outer "X" marks is required for this mode of operation.

If the scan rate of the slit pattern is variable or unknown, it may be difficult to use a fixed delay line. It is possible to expand the shift register, as shown in FIG. 11, to provide for servo control of either scan rate or shift frequency. As illustrated, code outputs are summed for an expanded code pattern A and a contracted pattern B (shown as a factor of 2 for convenience) and used as error signals. When the shifting rate is correct, these outputs will be equal and their difference zero. If the shifting rate is too high, the code pattern will be expanded and the expanded output will increase while the contracted output decreases. The same method can be used to control a scanning disk drive motor or the delay of an electrically variable delay line.

The above-described embodiments are illustrative of preferred embodiments of the invention but are not intended to limit the possibilities of insuring improved detection of radiation sources. For example, in some applications autocorrelation functions having two or more peaks may be useful or necessary. Furthermore, although an electrical delay line is specifically disclosed herein, it should be appreciated that such a delay line is useful for relatively short codes and rapid scanning. For longer scan times acoustic or magnetostrictive delay lines are more appropriate. Equivalent lumped constant electrical delay lines can also be used. In addition, inverting amplifiers and attenuators may be associated with selected delay line taps to provide the summing circuit with different amplitude positive or negative inputs. This provides advantages in suppressing background radiation and facilitating control of the side lobes of the autocorrelation function.

The arrangements disclosed herein are examples of those in which the inventive features of this disclosure may be utilized, and it will become apparent to one skilled in the art that certain modifications may be made within the spirit of the invention as defined by the appended claims.

What is claimed is:

1. A scanning system for the detection of radiation from source, such as a star, comprising:
a scanning disk relatively movable with respect to said source and provided with a plurality of slits arranged in a coded pattern;
a photodetector for converting radiation energy passing through said slits to an electrical signal;
delay means connected to said photodetector so as to receive said electrical signal and to delay same;
a summing circuit; and
means joining separate portions of said delay means to the summing circuit, said separate portions being selected to develop delays which are functionally related to position of said slits in the coded pattern, the delayed electrical signal passed from each portion to the summing circuit being combined by said circuit to produce an output voltage having at least one peak amplitude and side lobes of lesser amplitude.

2. A scanning system as set forth in claim 1, wherein said electrical signal is connected to the delay means through an amplifier, at least one of said photodetector and said amplifier having non-linear response characteristics.

3. A scanning system as set forth in claim 1, wherein said delay means is an electrical delay line.

4. A scanning system as set forth in claim 1, wherein said delay means is an acoustical delay line.

5. A scanning system as set forth in claim 1, wherein said delay means is a magnetostrictive delay line.

6. A scanning system as set forth in claim 1, wherein said delay means includes a movable memory having a recording head connected to said photodetector, and read heads connected to the summing circuit and positioned adjacent said memory in a configuration functionally related to the positions of said slits on the scanning disk.

7. A scanning system as set forth in claim 1, wherein said delay means comprises a shift register and said electrical signal is connected to the shift register through an analog-to-digital converter.

8. A scanning system as set forth in claim 1 wherein said joining means includes amplifiers having negative output gain characteristics to produce non-positive side lobe amplitudes.

9. A scanning system as set forth in claim 1 further comprising second means joining second portions of said delay means to the summing circuit, said second joining means including means having negative gain characteristics and said second portions of said delay means being selected to produce a summing circuit output voltage having non-positive side lobe amplitudes and at least one positive peak amplitude.

10. A scanning system as set forth in claim 1 further comprising second means joining second portions of said delay means to the summing circuit, said second joining means including means having negative gain characteristics whereby the steady-state sum of the output voltages produced by said first and second joining means is substantially zero.

11. A scanning system as set forth in claim 7, further comprising means responsive to the signal content of said register to control its rate of shift.

12. A scanning system as set forth in claim 7 further comprising means responsive to the signal content of said shift register to control the speed of rotation of said scanning disk.

13. A scanning system as set forth in claim 1, wherein the scanning disk further comprises a predetermined plurality of transparent and opaque areas limited as follows:

$$(N_1 - 1) + 2^{N_1 - 2} \leq N_T \leq 2N_1 - 1$$

where:

$N_1$ = total number of transparent areas
$N_T$ = total number of transparent and opaque areas.

14. A scanning system as set forth in claim 1, wherein the scanning disk further comprises a predetermined plurality of transparent and opaque areas limited as follows:

$$N_T = \frac{N_1(N_1 - 1)}{2} + 1$$

where:

$N_1$ = total number of transparent areas
$N_T$ = total number of transparent and opaque areas.

15. A scanning system as set forth in claim 1, wherein the scanning disk further comprises a predetermined plurality of transparent and opaque areas limited as follows:

$$N_0 = 2^{N_1 - 2} - 1$$

where:

$N_0$ = total number of opaque areas
$N_1$ = total number of transparent areas.

References Cited

UNITED STATES PATENTS

| | | | |
|---|---|---|---|
| 2,972,276 | 2/1961 | Whitney | 250—233 X |
| 3,009,065 | 11/1961 | McKnight et al. | 250—203 X |
| 3,002,098 | 9/1961 | Watkins | 250—233 X |
| 3,134,022 | 5/1964 | Jones et al. | 250—203 X |
| 3,136,895 | 6/1964 | Whitney | 250—203 X |
| 3,220,298 | 11/1965 | Powell et al. | 250—203 X |
| 3,422,548 | 1/1969 | Waldhauer | 250—203 X |

JAMES W. LAWRENCE, Primary Examiner

C. R. CAMPBELL, Assistant Examiner

U.S. Cl. X.R.

250—201, 233